United States Patent [19]

Metlitsky

[11] Patent Number: 5,210,398
[45] Date of Patent: May 11, 1993

[54] OPTICAL SCANNER WITH EXTENDED DEPTH OF FOCUS

[75] Inventor: Boris Metlitsky, Stony Brook, N.Y.

[73] Assignee: Symbol Technologies, Inc., Bohemia, N.Y.

[21] Appl. No.: 717,771

[22] Filed: Jun. 14, 1991

[51] Int. Cl.[5] .................................... G06K 7/10
[52] U.S. Cl. ........................... 235/462; 235/472
[58] Field of Search .................. 235/462, 472, 467

[56] References Cited

U.S. PATENT DOCUMENTS

| | | | |
|---|---|---|---|
| 4,251,798 | 2/1981 | Swartz et al. | 235/462 |
| 4,496,831 | 1/1985 | Swartz et al. | 235/472 |
| 4,500,776 | 2/1985 | Laser | 235/454 |
| 4,560,862 | 12/1985 | Eastman et al. | 235/462 |
| 4,758,717 | 7/1988 | Shepard et al. | 235/472 |
| 4,808,804 | 2/1989 | Krichever et al. | 235/462 |
| 4,816,661 | 3/1989 | Krichever et al. | 235/472 |
| 4,831,275 | 5/1989 | Drucker | 250/566 |
| 4,843,222 | 6/1989 | Hochgraf | 235/462 |
| 4,877,949 | 10/1989 | Danielson et al. | 235/462 |
| 4,887,019 | 12/1989 | Reis et al. | 350/6.1 |
| 4,916,318 | 4/1990 | Iima | 250/568 |
| 4,933,538 | 6/1990 | Heiman et al. | 235/462 |
| 4,978,860 | 12/1990 | Bayley et al. | 250/568 |
| 5,010,241 | 4/1991 | Butterworth | 235/462 |
| 5,059,779 | 10/1991 | Krichever et al. | 235/467 |
| 5,122,644 | 6/1992 | Hasegawa et al. | 235/462 |
| 5,136,147 | 8/1992 | Metlitsky et al. | 235/462 |

FOREIGN PATENT DOCUMENTS

3602008  7/1987  Fed. Rep. of Germany ...... 235/463

*Primary Examiner*—John Shepperd
*Assistant Examiner*—Esther Chin

[57] ABSTRACT

An optical bar code scanner and method which achieves an extended depth of focus by employing a multifocal length collection optical system. A radiation beam is generated for illuminating a field of view, either by a laser or nonlaser source. The embodiments specifically disclosed herein employ nonlaser sources such as LEDs. The multifocal length collection optical system consisting of a plurality of lenses or mirrors having at least a near range focal length and a long range focal length, simultaneously collects radiation reflected from objects in the field of view, and directs it to an optical detector for detection and generation of an electrical output signal indicative thereof. The electrical output signal of the detector is then passed through a high pass filter which filters out a DC background electrical signal, thereby improving the depth of modulation of the signal.

53 Claims, 7 Drawing Sheets

OPTICAL SCANNER WITH EXTENDED DEPTH OF FOCUS

BACKGROUND OF THE INVENTION

1. Field of the Invention

The present invention relates generally to an optical scanner and method of scanning with an extended depth of focus, and more particularly pertains to an optical scanner and method of scanning bar codes which achieves an extended depth of focus by employing a multifocal length optical system. The subject invention is particularly useful in an optical scanner employing a nonlaser radiation source such as a light emitting diode (LED) or a linear array of LEDs, but is also applicable to optical scanners employing a laser source such as a laser diode. The subject invention is very useful in CCD based bar code readers.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, light beam, at a target and a symbol to be read.

The light source in a laser scanner is typically a gas laser or semiconductor laser The use of a semiconductor devices such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporate detectors based upon charge coupled device (CCD) technology. In such readers size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to be properly read. Such physical contact of the reader with the symbol is a preferred mode of operation for me applications, or as a matter of personal preference by the user.

The depth of focus of bar code scanners using Light Emitting Diodes (LEDs) is very limited as compared to laser based scanners. The reason is that the f# of, for example, a CCD based scanner with an LED source of illumination is much lower than the f# of a laser scanner. As a consequence thereof, the depth of focus, which is proportional to f#$^2$, is very low for such CCD/LED based scanners.

SUMMARY OF THE INVENTION

Accordingly, it is a primary object of the present invention to provide an optical scanner and method of scanning with an extended depth of focus.

A further object of the subject invention is the provision of an optical scanner and method of scanning which achieves an extended depth of focus by employing a multifocal optical system.

Another object of invention by employing a special electrical processing circuit which filters out the low frequency signal component of the reflected light signal.

In accordance with the teachings herein, the present invention provides an optical scanner and method of scanning with an extended depth of focus for electro-optically reading indicia having parts of different light reflectivity such as a bar code pattern. A radiation beam is generated for illuminating a field of view, either by a laser or nonlaser source. The embodiments specifically disclosed herein employ nonlaser sources such as LEDs which are cheaper than but have a more limited depth of focus than laser sources, but the principles of operation of the present invention are equally applicable to laser sources such as semiconductor laser diodes or laser tubes. In a CCD embodiment, for example, A multifocal length collection optical system, having at least a near range focal length and a long range focal length, collects radiation reflected from objects in the field of view, and directs it to an optical detector for detection and generation of an electrical output signal indicative thereof. The electrical output signal of the detector is then passed through a high pass filter which filters out a DC background electrical signal, thereby improving the depth of modulation (DOM) of the signal, and passes electrical output signals resulting from the detection of an indicia having parts of different light reflectivity.

In one disclosed embodiment, the multifocal optical system includes a multifocal lens system, which may comprise a plurality of lenses such as a plurality of concentric lenses, each having a different focal point. The optical detector includes a charge coupled detector having a plurality of charge coupled detection cells, and the field of view is scanned by scanning the electrical outputs of the plurality of charge coupled detection cells, rather than by using an oscillating scanning mirror element. A high pass electrical may be employed to filter out the low frequency signal components of the reflected light. The radiation beam may be generated by a light emitting diode or a linear array of light emitting diodes, or by a laser source such as a laser diode.

In a second disclosed embodiment, the multifocal optical system includes a multifocal mirror system which includes a plurality of mirrors, with a first detection mirror having a near range focal length, and a second detection mirror having a far range focal length. The area of the second mirror is preferably larger than the area of the first mirror to compensate for the 1/f$^2$ fall off in the signal collected by each mirror, wherein f is the focal length. In this embodiment, the radiation beam may be generated by an LED or an LED array, or by a laser source such as a laser diode. The optical detector is preferably a photodiode, the output of which is passed through a high pass filter for filtering out a DC background electrical signal while passing electrical output signals resulting from the detection of an indicia having parts of different light reflectivity.

In a third embodiment one can have a multifocus optical system for the single laser source or a plurality of laser beams focussed at different distances but combined in one substantially coaxial beam.

BRIEF DESCRIPTION OF THE DRAWINGS

The foregoing objects and advantages of the present invention for an optical scanner with an extended depth of focus may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
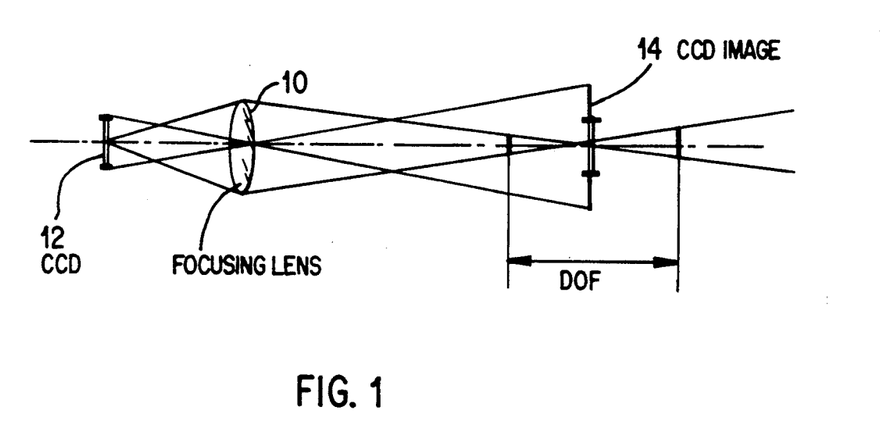
FIG. 1 is a schematic illustration of a typical prior art optical system for an LED/CCD bar code scanner.

Referring to the drawings in detail, FIG. 1 is a schematic illustration of a typical prior art optical system for an LED/CCD bar code scanner in which a single focal length lens system 10 images a field of view at its focal length onto a CCD detector 12, and conversely forms an image of the CCD detector at its focal length 14. The optical scanner of FIG. 1 has a given depth of field (DOF) within which it defines a maximum beam diameter which enables it to read a bar code symbol of a given density (width of lines defining the bar code symbol). Moreover, as illustrated in FIG. 1, usually the CCD is focused right at the nose or front window 16 of the scanner, as a consequence of which half of the depth of focus is lost.

Figure 2A:
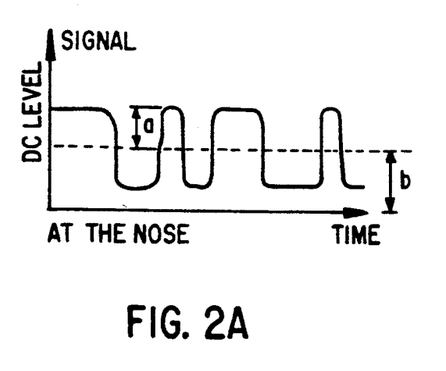
FIGS. 2A and 2B illustrate typical detector waveforms for the scanner of FIG. 1 for a detected bar code pattern positioned, first at the focal point at the nose of the scanner, and secondly further out at the far edge of the depth of focus of the scanner.
Figure 2B:
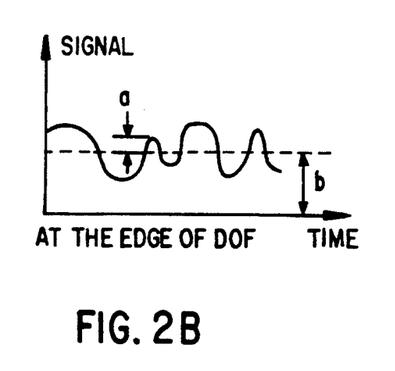

FIGS. 2A and 2B illustrate typical detector waveforms for the CCD scanner of FIG. 1 for a detected bar code pattern positioned first at the focal point at the nose or front window of the scanner and secondly further out at the far edge of the depth of focus of the scanner.

Figure 3:
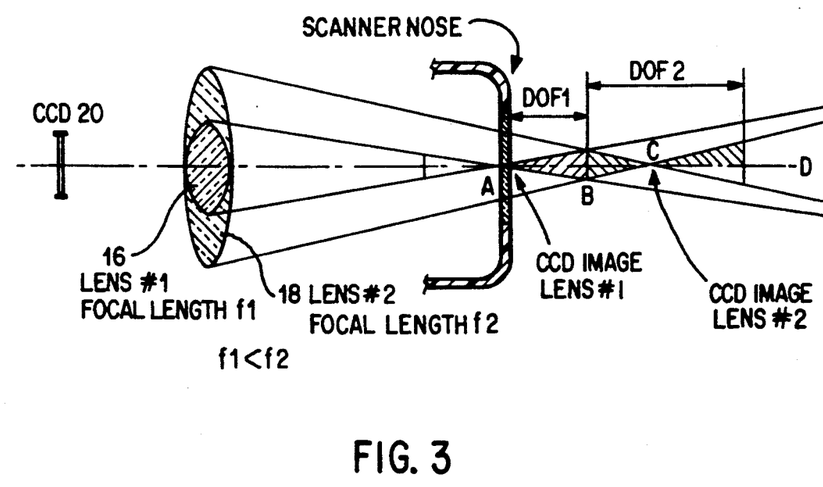
FIG. 3 depicts a first embodiment of a scanner with an extended depth of focus pursuant to the teachings of the present invention in which the focusing optical system includes a first lens focused at a near focal length and a second lens focused at a far focal length.

FIG. 3 depicts a first embodiment of a scanner with an extended depth of focus pursuant to the teachings of the present invention in which the focusing optical system includes a first lens 16 focused at a near focal length and a second lens 18 focused at a far focal length. The present invention uses a multifocal optical system preferably in combination with a high pass filter signal processing technique to increase the depth of focus or working range of the bar code scanner. Both lenses form an image of the target (bar code) on the CCD detector simultaneously. Signal waveforms for different points a, b, c and d along the optical axis are as illustrated in FIGS. 4-9 and explained hereinbelow.

Figure 4A:
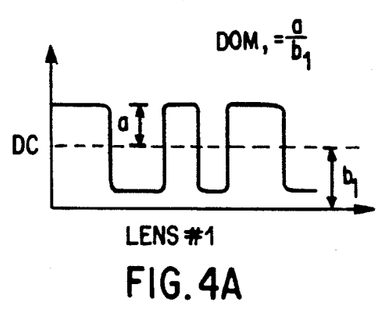
FIGS. 4A, 4B and 4C illustrate typical detector waveforms for the scanner of FIG. 3 for a detected bar code pattern positioned at the focal point of the first lens at the nose of the scanner and also illustrate a summed detector waveform.
Figure 4B:
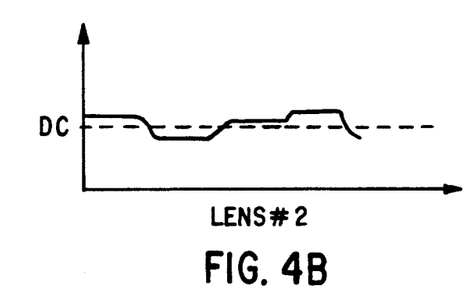
Figure 4C:
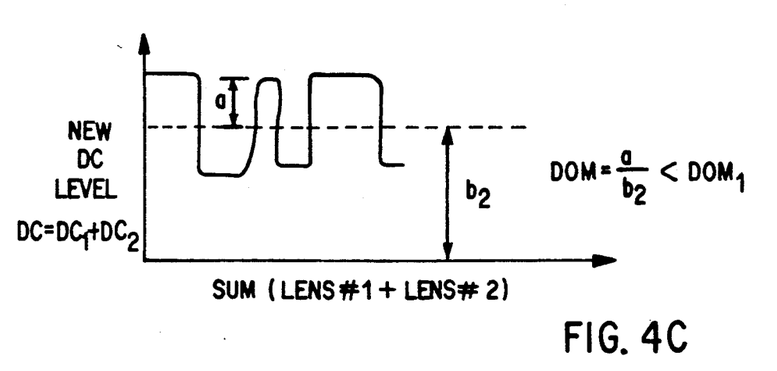

FIGS. 4A, 4B and 4C illustrate typical detector waveforms for the scanner of FIG. 3 for a detected bar code pattern positioned at point a at the focal point of the first lens at the nose or front window of the scanner.

Figure 5A:
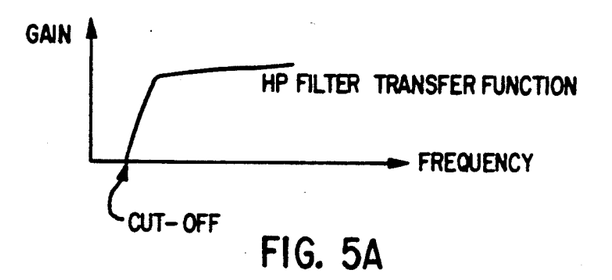
FIGS. 5A, 5B, 5C and 5D depict the characteristic curve of a high pass filter and also show the summed detector output waveform before and after the signal has passed through a high pass filter.
Figure 5B:
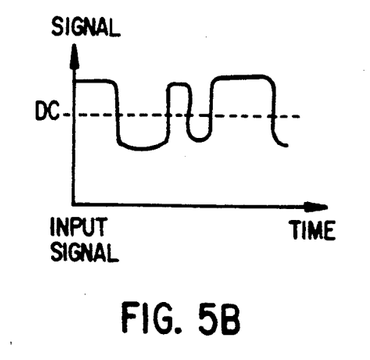
Figure 5C:
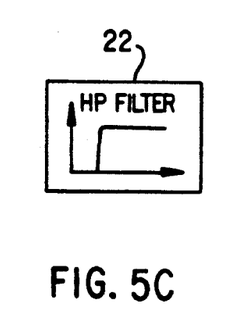
Figure 5D:
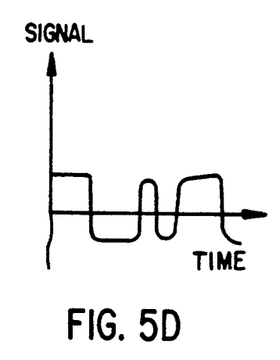

In general, the addition of the two signals shown in FIGS. 4A and 4B results in a smaller depth of modulation of the summed signal shown in of FIG. 4C which presents a substantial problem for the digitizer (ADC—analog to digital converter). To improve the depth of modulation, the signal is filtered through a high pass filter having a bandpass characteristic as shown in FIG. 5A in order to eliminate the background DC level therefrom. FIGS. 5, 5B, 5C and 5D depict the summed detector output waveform before and after the signal has passed through a high pass filter 22.

Figure 6A:
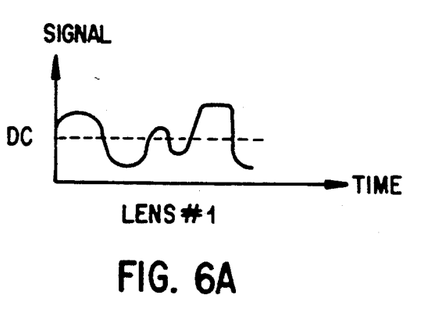
FIGS. 6A and 6B illustrate typical detector waveforms for the scanner of FIG. 3 for a detected bar code pattern positioned between the focal points of the first and second lenses at the edges of their respective depth of focus ranges.
Figure 6B:
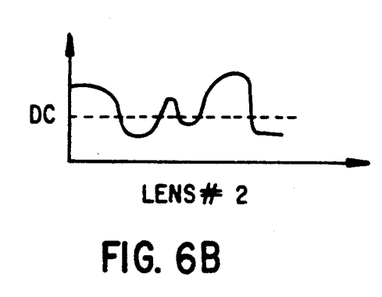
Figure 7A:
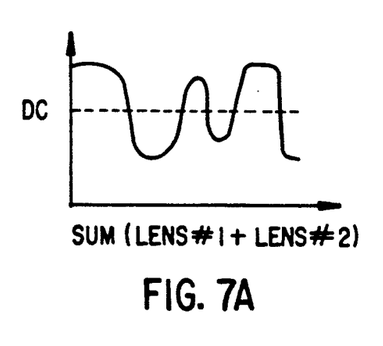
FIGS. 7A, 7B and 7C show the summed detector output waveform of FIGS. 6A and 6B before and after the signal has passed through a high pass filter.
Figure 7B:
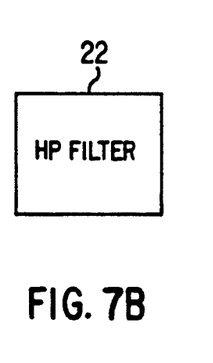
Figure 7C:
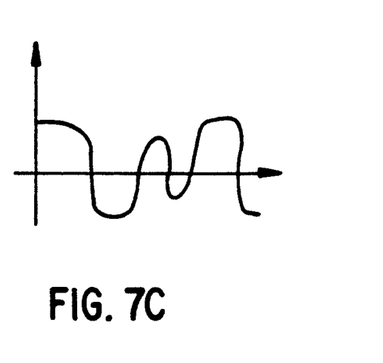

FIGS. 6A and 6B illustrate typical detector waveforms for the scanner of FIG. 3 for a detected bar code pattern positioned at point b between the focal points of the first and second lenses at the edges of their respective depth of focus ranges. FIGS. 7A, 7B and 7C show the summed detector output waveform before and after the signal has passed through a high pass filter 22.

The situation at point c is very similar to the situation at point a.

Figure 8A:
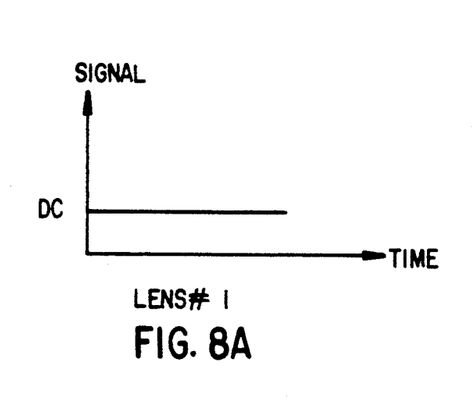
FIGS. 8A and 8B illustrate typical detector waveforms for the scanner of FIG. 3 for a detected bar code pattern positioned at the far edge of the depth of focus range of the second lens.
Figure 8B:
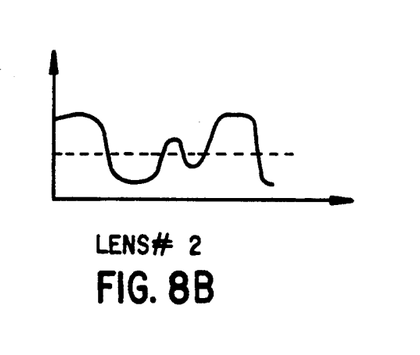
Figure 9A:
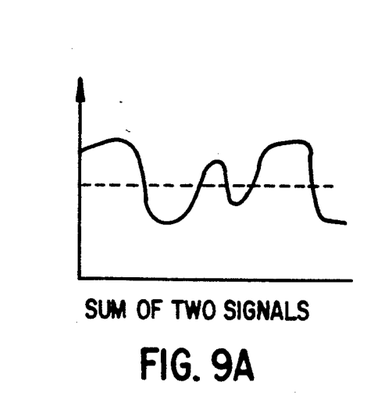
FIGS. 9A, 9B and 9C show the summed detector output waveform of FIGS. 8A and 8B before and after the signal has passed through a high pass filter.
Figure 9B:
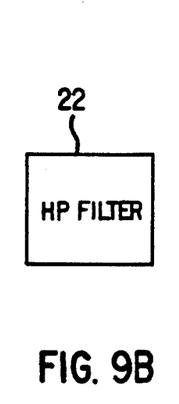
Figure 9C:
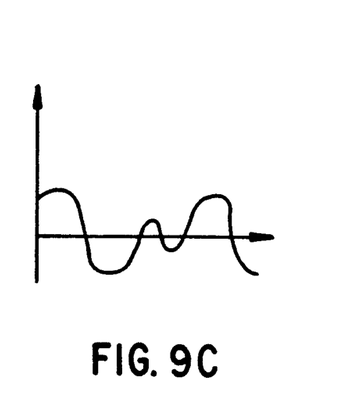

FIGS. 8A and 8B illustrate typical detector waveforms for the scanner of FIG. 3 for a detected bar code pattern positioned at point d wherein the first lens is completely out of focus, and at the far edge of the depth of focus range of the second lens. FIGS. 9A and 9C show the summed detector output waveform before and after the signal has passed through a high pass filter 22.

Passing the sum of the two signals through a high pass filter 22 produces a more workable signal (a signal with a greater depth of modulation). The high pass filter serves as a discriminator removing DC level signals from the signal.

Figures 10A, 10B, 11:
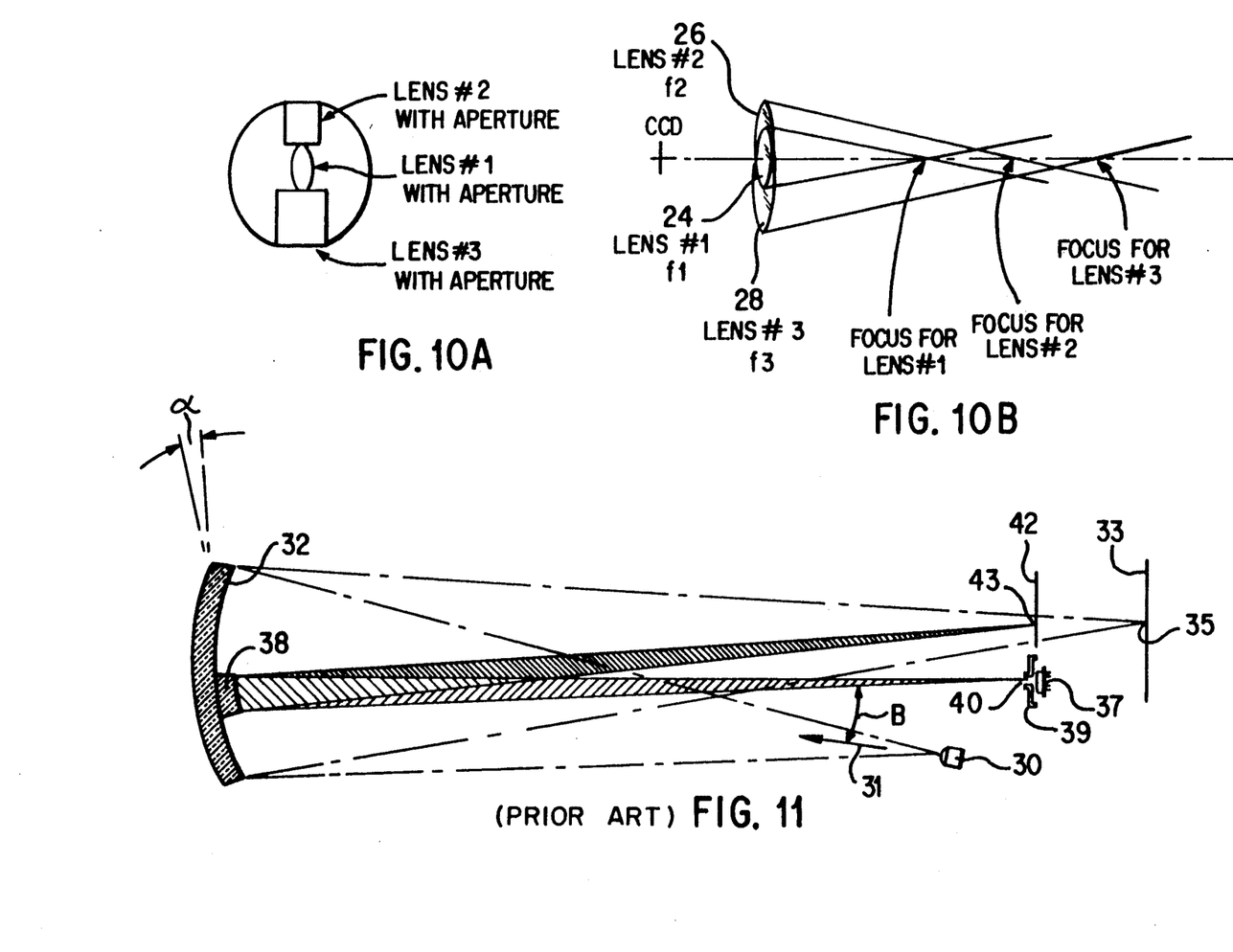
FIGS. 10A and 10B illustrate a second embodiment of a scanner with an extended depth of focus pursuant to the teachings of the present invention in which the focusing optical system includes a first lens focused at a near focal length, a second lens focused at a medium focal length, and a third lens focused at a very long focal length.
FIG. 11 is a schematic illustration of a prior art optical system for a nonlaser LED bar code scanner.

In alternative embodiments, three or more optical systems could be utilized simultaneously, and the depth of focus would be extended even further. FIGS. 10A and 10B illustrate a second embodiment of a scanner with an extended depth of focus pursuant to the teachings of the present invention in which the focusing optical system includes a first lens 24 focused at a near focal length, a second lens 26 focused at a medium focal length, and a third lens 28 focused at a very long focal length.

The rectangular shapes of the apertures shown in the left portion of FIG. 10 in front of lenses is optional, and the aperture could take any suitable shape such as oval, circular, etc. However, the width of the aperture should be proportionately larger for the lens imaging the CCD further away, as shown by the apertures for the first, second and third lenses. This maintains the f# of the optical systems constant, or where there is a need to increase the signal collected from a larger distance, to decrease the f# of lenses imaging the CCD further away. It is important to remember that the collected signal is roughly $\sim (1)/(f\#^2)$.

The shape of the proposed lens is not simple, but is well within the state of the art of present plastic optics technology. The use of diffractive optics is possible also.

The same method of extension of the depth of focus is applicable to an LED type of bar code scanner as disclosed in patent application Ser. No. 562,130, filed Aug. 3, 1990, and illustrated generally in FIG. 11. The system of FIG. 11 includes a nonlaser type of light source 30, such an LED or semiconductor light emitting diode. The source 30 produces a noncoherent, noncollimated, wide angle light beam 31 which is focused by a curved mirror 32 onto a plane 33. The spot 35 of light produced by the focused beam 31 is much larger than the minimum dimension of the bars or spaces of a bar code symbol located in the viewing plane 33. A light sensor 37 such as a photodiode is included in the system of FIG. 11, and the light reflected from the bar code symbol due to light beam 31 is focused by a smaller curved mirror 38 onto the detecting surface of the sensor 37. An apertured wall 39 blocks reflected light from reaching the sensor 37 except that passing through a slit aperture 40. This slit aperture is preferably of an elliptical shape, perhaps 6×16 mils in size, to define a field view or viewing window for the sensor. The viewing window of the sensor 37 is focused by the mirror 38 to be in a plane 42, which is axially spaced from the focal plane 33 produced by the mirror 32 for the light beam 31. The symbol 43 to be read is located in the plane 42, so the image of the slit 40 in the plane 42 forms the viewing window on the symbol. The focal lengths of the two mirrors 32 and 38 are the same in the exemplary embodiment, so the spacing between plane 33 and plane 42 is due to the difference in spacing of the light source 30 and the sensor 37 from the mirrors.

The mirrors 32 and 38 are driven by a motor so that the spot 35 and the viewing window move in the plane 42 across the symbol in a scan line. The smaller mirror 38 is mounted on the larger mirror 32 and is angularly displaced in a manner such that a central axis of the mirror 38 is displaced by an angle $\alpha$ with respect to a central axis of the mirror 32. The light source 30 is on an axis with respect to the mirror 32 which is angularly displaced by an angle $\beta$ with respect to an axis on which the sensor 37 is positioned. The angle $\alpha$ is one-half that of angle $\beta$.

The scanned spot 35 resulting from the light beam 31 is much larger than the viewing window of the sensor 37, so only a very small part of the illumination by the light beam is sensed; of course, only a small part of the reflected light reaches the photodetector. In addition, an LED generally produces a light beam of lower intensity compared to a laser source. Thus it is important that the mirror 32 be large so that more the LED light is focused onto the scan plane and the light density in the spot 35 is reasonably high.

Note that the construction of a typical laser scanner is reversed from that of FIG. 11; in a laser scanner a bright, sharply focused laser beam produces a spot of about the size of the minimum dimension of the bar code pattern, then the photodetector employed has a field of view much larger than the laser beam spot. In contrast, here the spot 35 produced by the light beam is large, and the viewing window is small.

Figure 12:
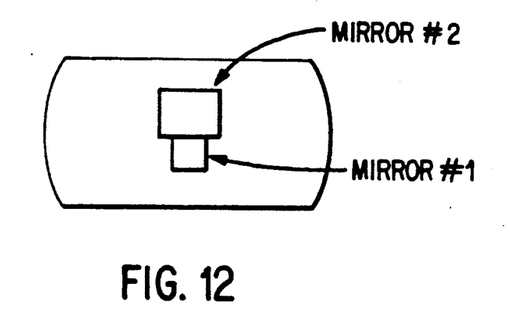
FIG. 12 illustrates a third embodiment of a scanner with an extended depth of focus pursuant to the teachings of the present invention similar to that of FIG. 11, but in which the focusing optical system includes a first detection mirror focused at a near focal length and a second detection mirror focused at a far focal length.
Figure 13A:
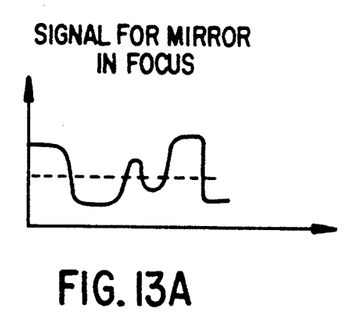
FIGS. 13A, 13B, 13C, 13D and 13E show typical detector waveforms for the scanner of FIG. 12, in which the summed output signal is passed through a differentiator circuit which also functions as a high pass filter.
Figure 13B:
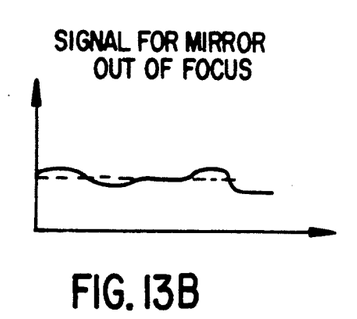
Figure 13C:
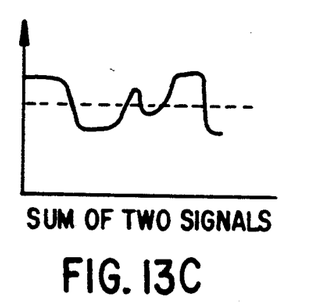
Figure 13D:
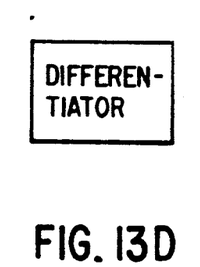
Figure 13E:
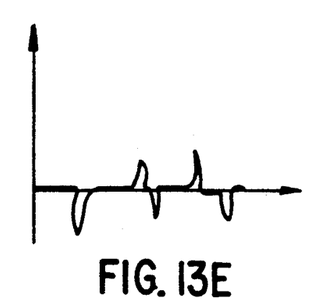

FIG. 12 illustrates a third embodiment of a scanner with an extended depth of focus pursuant to the teachings of the present invention similar in concept to the system of FIG. 11, but in which the focusing optical system includes a first detection mirror 50 focused at a near focal length and a second detection mirror 52 focused at a far focal length. Pursuant to the embodiment of FIG. 12, the several small detection mirrors 50, 52 image the small aperture 40 in front of the photodiode 37 at two (or more) different distances. This arrangement in combination with a high pass filter 22 in the analog processing circuitry provides for an extended depth of focus.

FIGS. 13A, 13B, 13C, 13D and 13E show typical detector waveforms for the scanner of FIG. 12, in which the summed output signal is passed through a differentiator circuit 52 which also functions as a high pass filter. One of the most efficient digitizers currently in commercial usage utilizes a first derivative of the detector signal in combination with peak signal detection. Accordingly, the high pass filter can be implemented by the differentiator circuit 52 which by its very nature is a high pass filter.

Figure 14:
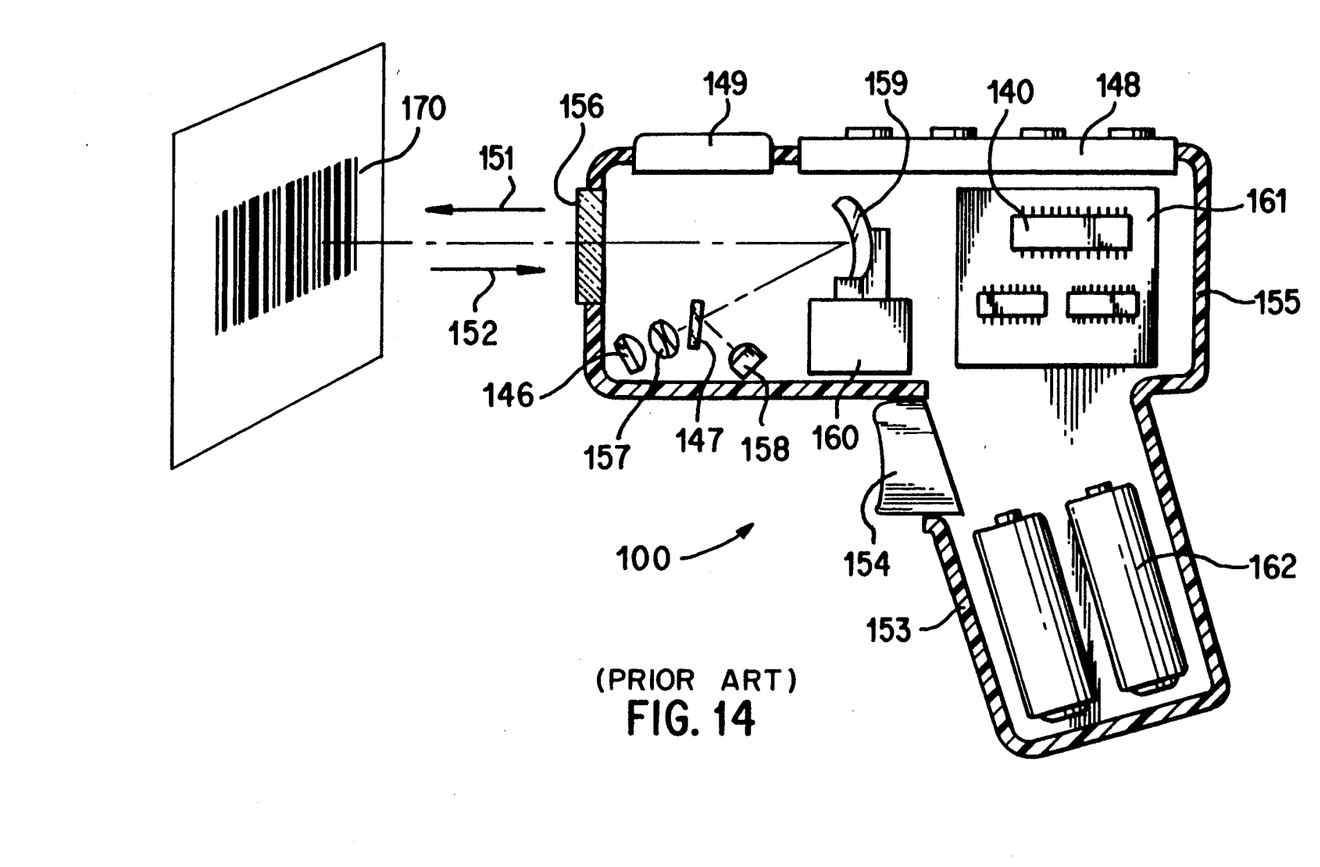
FIG. 14 illustrates a highly simplified embodiment of one type of bar code reader which can be utilized in association with the optical scanner with extended depth of focus of the present invention.

FIG. 14 illustrates a highly simplified embodiment of one type of bar code reader that may be modified to utilize the optical scanner with an extended depth of focus of the present invention. A reader 100 may be implemented in a hand-held scanner, as illustrated, or a desk-top workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 14 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 14. These U.S. Pat. Nos. 4,760,248, 4,896,026 and 4,409,470 are incorporated herein by reference, but the general design of such devices will be briefly described here for reference.

Referring to FIG. 14 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun shaped device having a pistol-grip type of handle 153. A movable trigger 154 is employed to allow the user to activate the light beam 151 and detector circuitry when the user has positioned the device to point at the symbol to be read. A light-weight plastic housing 155 contains the laser light source 146, the detector 158, the optics 157, 147, 159, and signal processing circuitry including a detector 17, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 14, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table of attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control of data lines associated with such components may be connected to an electrical connector mounted on the edge or external surface of the module to enable the module to be electrically connected to a mating connector associated with other elements of data acquisition system.

An individual module may have specific scanning or decoding characteristics associated therewith, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

While several embodiments and variations of the present invention for an optical scanner with an extended depth of focus are described in detail herein, it should be apparent that the disclosure and teachings of the present invention will suggest many alternative designs to those skilled in the art.

What is claimed is:

1. A scanner with an extended depth of focus for electro-optically reading indicia having parts of different light reflectivity, comprising:

a. means for generating a radiation beam for illuminating a field of view;

b. a multifocal length collection optical system, having at least a first near range focal length and a second long range focal length, for simultaneously collecting radiation reflected from objects in the field view;

c. an optical detector for detecting radiation reflected from the field of view and directed thereto by the multifocal length optical system, and for generating an electrical output signal indicative thereof; and d. a high pass filter coupled to the electrical output signal of the optical detector for filtering out a low frequency electrical signal to improve the depth of modulation of the signal while passing an electrical output signal resulting from the detection of an indicia having parts of different light reflectivity.

2. A scanner with an extended depth of focus as claimed in claim 1, wherein said multifocal length collection optical system includes a multifocal length lens system.

3. A scanner with an extended depth of focus as claimed in claim 2, wherein said multifocal length lens system includes a plurality of different lenses, each having a different focal point.

4. A scanner with an extended depth of focus as claimed in claim 3, wherein said plurality of different lenses include a plurality of concentric lenses.

5. A scanner with an extended depth of focus as claimed in claim 2, wherein said optical detector includes a charge coupled detector having a plurality of charge coupled detection cells, and wherein the field of view is scanned by scanning the electrical outputs of the plurality of charge coupled detector cells.

6. A scanner with an extended depth of focus as claimed in claim 5, wherein said charge coupled detector includes an array of charge coupled diodes arranged in a common focal plane, with each diode being operative to emit an electrical current signal indicative of the intensity of the detected radiation.

7. A scanner with an extended depth of focus as claimed in claim 2, wherein said generating means includes a light emitting diode.

8. A scanner with an extended depth of focus as claimed in claim 2, wherein said generating means includes a linear array of light emitting diodes.

9. A scanner with an extended depth of focus as claimed in claim 2, wherein said generating means includes a laser diode.

10. A scanner with an extended depth of focus as claimed in claim 2, including said high pass filter coupled to claimed in claim, the electrical output signal of the optical detector for filtering out a DC background electrical signal to improve the depth of modulation of the signal while passing an electrical output signal resulting from the detection of an indicia having parts of different light reflectivity.

11. A scanner with an extended depth of focus as claimed in claim 1, wherein said multifocal length collection mirror system includes a multifocal length mirror system.

12. A scanner with an extended depth of focus as claimed in claim 11, wherein said multifocal length mirror system includes a plurality of mirrors, with a first collection mirror having a near range focal length, and a second collection mirror having a far range focal length.

13. A scanner with an extended depth of focus as claimed in claim 11, said generating means including at least one light emitting diode.

14. A scanner with an extended depth of focus as claimed in claim 11, said optical detector including a photodiode.

15. A scanner with an extended depth of focus as claimed in claim 1, including a housing for supporting said generating means, said multifocal length collection optical system, and said optical detector.

16. A scanner with an extended depth of focus as claimed in claim 15, wherein said housing includes a handle for enabling an operator to grasp the housing throughout the reading of the indicia.

17. A scanner with an extended depth of focus as claimed in claim 1, wherein said optical detector includes a charge coupled detector having a plurality of charge coupled detection cells, and wherein the field of view is scanned the electrical outputs of the plurality of charge coupled detector cells.

18. A scanner with an extended depth of focus as claimed in claim 17, wherein said charge coupled detector includes an array of charge coupled diodes arranged in a common focal plane, with each diode being operative to emit an electrical current signal indicative of the intensity of the detected radiation.

19. A scanner with an extended depth of focus as claimed in claim 1, wherein said optical detector includes a photodiode, and a scanning reflector is provided for scanning the field of view.

20. A scanner with an extended depth of focus as claimed in claim 1, wherein said generating means includes a light emitting diode.

21. A scanner with an extended depth of focus as claimed in claim 1, wherein said generating means includes a linear array of light emitting diodes.

22. A scanner with an extended depth of focus as claimed in claim 1, wherein said generating means includes a laser diode.

23. A scanner with an extended depth of focus for electro-optically reading bar code symbols having parts of different light reflectivity, comprising:
 a. means for generating a radiation beam for illuminating a field of view;
 b. a multifocal length collection optical system, including a first mirror having at least a first focal length and a second mirror having a second focal length different from said first local length, for collecting radiation reflected from objects in the field of viwe wherein the area of the second mirror is larger than the area of the first mirror to compensate for the $1/f^2$ fall off in the signal collected by each mirror, where f is the focal length; and
 c. an optical detector for detecting radiation reflected from the field of view and directed thereto by the multifocal length optical system, and for generating an electrical output signal indicative of the radiation collected by said optical system.

24. A scanner with an extended depth of focus as claimed in claim 23, wherein said optical detector includes a photodiode, and a scanning reflector as provided for scanning the field of view.

25. A scanner with an extended depth of focus for electro-optically reading bar code symbols having parts of different light reflectivity, comprising:
 a. means for generating a radiation beam for illuminating a field of view;
 b. a multifocal length collection optical system, including a first mirror having at least a first focal length and a second mirror having a second focal length different from said first focal length, for collecting radiation reflected from objects in the field view wherein said first and second mirrors are positioned on a large scanning mirror surface which focuses an LED light source as a scanning beam directed at a field of view, and said first collection mirror focuses an image of a small aperture positioned in front of a photodiode detector at a near range in the field of view, and said second collection mirror focuses an image of the small aperture positioned in front of said photodiode detector at a far range in the field of view; and
 c. an optical detector for detecting radiation reflected from the field of view and directed thereto by the multifocal length optical system, and for generating an electrical output signal indicative of the radiation collected by said optical system.

26. A scanner with an extended depth of focus for electro-optically reading bar code symbols having parts of different light reflectivity, comprising:
 a. means for generating a radiation beam for illuminating a field of view;
 b. a multifocal length collection optical system, having at least a first component with a first focal length, and a second component with a second focal length different from said first focal length, said first and second components for jointly collecting radiation from objects in the field view; and
 c. an optical detector for detecting radiation reflected from the field of view and directed thereto by the multifocal length optical system, and for generating an electrical output signal indicative of the radiation collected by said first and second assemblies.

27. A scanner as defined in claim 26, further comprising a filter coupled to the optical detector and having a bandpass characteristic so as to filter out an electrical signal of predetermined frequency range to improve the depth of modulation of the signal while passing an electrical output signal resulting from the detection of an indicia having parts of different light reflectivity.

28. A scanner with an extended depth of focus as claimed in claim 26, wherein said optical detector includes a charge coupled detector having a plurality of charge coupled detection cells, and wherein the field of view is scanned by scanning the electrical outputs of the plurality of charge coupled detector cells.

29. A scanner with an extended depth of focus as claimed in claim 28, wherein said charge coupled detector includes an array of charge coupled diodes arranged in a common focal plane, with each diode being operative to emit an electrical current signal indicative of the intensity of the detected radiation.

30. A scanner with an extended depth of focus as claimed in claim 26, wherein said optical detector includes a photodiode, and a scanning reflector is provided for scanning the field of view.

31. A scanner with an extended depth of focus as claimed in claim 26, wherein said generating means includes a light emitting diode.

32. A scanner with an extended depth of focus as claimed in claim 26, wherein said generating means includes a linear array of light emitting diodes.

33. A scanner with an extended depth of focus as claimed in claim 26, wherein said generating means includes a laser diode.

34. A method of scanning with an extended depth of focus for electro-optically reading indicia having parts of different light reflectivity, comprising:
   a. generating a radiation beam for illuminating a field of view;
   b. simultaneously collecting radiation reflected from objects in the field of view with a multifocal length collection optical system, having at least a first near range focal length and a second long range focal length;
   c. detecting radiation reflected from the field of view and collected by the multifocal length optical system, and generating an electrical output signal indicative thereof.

35. A method of scanning with an extended depth of focus as claimed in claim 34, including passing the electrical output signal through a high pass filter to filter out a DC background electrical signal to improve the depth of modulation of the signal while passing an electrical output signal resulting from the detection of an indicia having parts of different light reflectivity.

36. A method of scanning with an extended depth of focus as claimed in claim 34, wherein said step of collecting radiation includes collecting radiation with a multifocal length lens system which includes a plurality of different lenses, each having a different focal point.

37. A method of scanning with an extended depth of focus as claimed in claim 34, wherein said step of collecting radiation includes collecting radiation with a multifocal length mirror system.

38. A method of scanning with an extended depth of focus as claimed in claim 27, wherein said step of collecting radiation with multifocal length mirror system includes collecting radiation with a first collection mirror having a near range focal length, and with a second collection mirror having a far range focal length.

39. A method for electro-optically reading bar code symbols having parts of different light reflectivity, comprising the steps of:
   a. generating a radiation beam for illuminating a field of view;
   b. simultaneously collecting radiation reflected from objects in the field view using a multifocal length collection optical system, having at least a first near range focal length optical assembly and a second long range focal length optical assembly; and
   c. detecting radiation reflected from the field of view and directed thereto by the multifocal length optical system, and generating an electrical output signal indicative of the radiation collected simultaneously by said first and second assemblies.

40. A method as defined in claim 39, further comprising the step of processing the electrical output signal to filter out a DC background electrical signal to derive the waveform of a detected bar code pattern.

41. A method as defined in claim 39, wherein said step of detecting radiation further comprises the step of scanning the field of view with a photodiode.

42. A method as defined in claim 39, wherein said generating step includes generating a beam from a light emitting diode.

43. A method as defined in claim 39, wherein said generating step includes generating a beam from a laser diode.

44. A method of scanning with an extended depth of focus for electro-optically reading indicia having parts of different light reflectivity, comprising:
   a. generating a radiation beam for illuminating a field of view;
   b. collecting radiation reflected from objects in the field view with a multifocal length collection optical system, having at least a first optical assembly with a near range focal length with a first light collecting area and a second optical assembly with a long range focal length and a second light collecting area different from the first; and
   c. detecting radiation reflected from the field of view and collected by the multifocal length optical system, and generating an electrical output signal indicative thereof.

45. A method as defined in claim 44, wherein said radiation is collected simultaneously from said first and second optical assemblies.

46. A method of scanning with an extended depth of focus as claimed in claim 44, including passing the electrical output signal through a high pass filter out a DC background electrical signal to improve the depth of modulation of the signal while passing an electrical output signal resulting from the detection of an indicia having parts of different light reflectivity.

47. A method of scanning with an extended depth of focus as claimed in claim 44, wherein said step of collecting radiation includes collecting radiation with a multifocal length lens system which includes a plurality of different lenses, each having a different focal point.

48. A method of scanning with an extended depth of focus as claimed in claim 44, wherein said step of collecting radiation includes collecting radiation with a multifocal length mirror system.

49. A method of scanning with an extended depth of focus as claimed in claim 44, wherein said step of collecting radiation includes collecting radiation with a first collection mirror having a near range focal length, and with a second collection mirror having a far range focal length.

50. A method of scanning with an extended depth of focus as claimed in claim 49, wherein the area of the second collection mirror is larger than the area of the first collection mirror to compensate for the $1/f^2$ fall off in the signal collected by each mirror, wherein f is the focal length.

51. A method of scanning with an extended depth of focus as claimed in claim 50, including the step of positioning said first and second mirrors on a large scanning mirror surface which focuses an LED light source as a scanning beam directed at a field of view, and focusing with said first collection mirror an image of a small aperture positioned in front of a photodiode detector at a near range in the field of view, and focusing with said second collection mirror an image of the small aperture positioned in front of said photodiode detector at a far range in the field of view.

52. A method of scanning with an extended depth of focus for electro-optically reading bar code symbols having parts of different light reflectivity, comprising:
   a. generating a radiation beam for illuminating a field of view;
   b. collecting radiation from the field of view with a multifocal length collection optical system, including a first mirror having at least a first focal length and a second mirror having a second focal length different from said first focal length, wherein the area of the second mirror is larger than the area of the first mirror to compensate for the $1/f^2$ fall off in the signal collected by each mirror, where f is the focal length; and c. detecting radiation reflected from the field of view and directed thereto by the multifocal length optical system, and generating an electrical output signal indicative of the radiation collected by said optical system.

53. A method of scanning with an extended depth of focus for electro-optically reading bar code symbols having parts of different light reflectivity, comprising:

a. generating a radiation beam for illuminating a field of view;

b. collecting radiation from the field of view with a multifocal length collection optical system, including a first mirror having at least a first focal length and a second mirror having a second focal length different form said first focal length, for collecting radiation reflected from objects in the field of view wherein said first and second mirrors are positioned on a large scanning mirror surface which focuses an LED light source as a scanning beam directed at a field of view, and said first collection mirror focuses an image of a small aperture positioned in front of a photodiode detector at a near range in the field of view, and said second collection mirror focuses an image of the small aperture positioned in front of said photodiode detector at a far range in the field of view; and c. detecting radiation reflected from the field of view and directed thereto by the multifocal length optical system, and generating an electrical output signal indicative of the radiation collected by said optical system.

* * * * *